United States Patent Office 3,024,226
Patented Mar. 6, 1962

3,024,226
POLYMERIZATION PROCESS
John T. Nolan, Jr., Wappingers Falls, and Harry Chafetz, Poughkeepsie, N.Y., assignors to Texaco Inc., New York, N.Y., a corporation of Delaware
No Drawing. Filed Nov. 23, 1959, Ser. No. 854,559
7 Claims. (Cl. 260—94.8)

This invention relates to the polymerization of isobutylene. More particularly, it relates to the production of isobutylene polymers which have a preponderance of molecules having a particular termination.

It is known to polymerize isobutylene using Friedel-Crafts type catalysts such as aluminum halides, ferric halides, zinc halides, boron halides, tin halides, mercuric halides, titanium halides and the like. Ordinarily, the reaction is carried out in the presence of a solvent or diluent such as a low molecular weight hydrocarbon, for example, propane, butane, isobutane, pentane, isopentane or an alkyl halide such as methyl chloride, ethyl chloride, chloroform and the like. Carbon disulfide is also a satisfactory solvent. Apparently the most commonly used combination is aluminum chloride or boron fluoride as a catalyst and a low molecular weight hydrocarbon as the solvent.

When boron fluoride is used as the catalyst a small amount of water, alcohol, carboxylic acid, mineral acid or ether is advantageously present as it serves to activate the catalyst.

The polymerization reaction may be carried out as either a batch or continuous process. Customarily, the isobutylene and solvent are introduced into the reactor at the desired temperature and the catalyst is then introduced into the reactor. Advantageously, the reaction vessel is equipped with cooling means to maintain the exothermic reaction at the desired temperature which may range from —40° or lower to 120° F. Pressures in the reactor may vary from atmospheric to 500 p.s.i.g. The catalyst concentration may range from 0.01–30% by weight of the feed, about 0.05–10% being preferred, the lower the ratio of catalyst to feed the higher the molecular weight of the product. In a continuous process, the catalyst may be added to the reactor as a slurry or solution in the solvent and the isobutylene may be added alone or dissolved in the solvent.

It is generally accepted that isobutylene polymerization using a Friedel-Crafts type catalyst proceeds by a cationic mechanism and not by an anionic or free radical mechanism. It has also been establshed that for the polymerization to take place, there must be present a co-catalyst which forms a complex with the nominal catalyst, and this complex is the true catalyst. The function of the catalyst is to donate a proton or carbonium ion to the monomer creating a carbonium ion which adds to a further monomer in a chain reaction. The reaction using boron trifluoride as a catalyst may be exemplified as follows:

Complex formation:

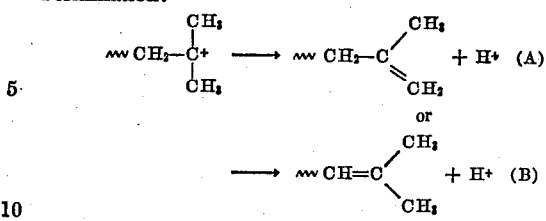

Initiation:

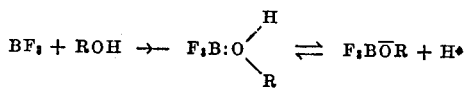

Propagation:

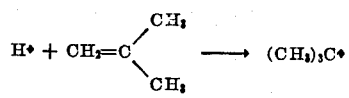

Termination:

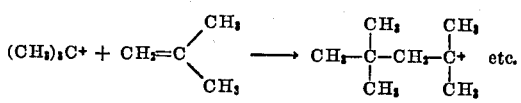

It should be realized that these carbonium ions and protons cannot exist as independent entities in the customary polymerization solvents and therefore the above representations are merely convenient methods of picturing the reactions. However, it will be noted that the chain terminates in a molecule which may have an external double bond as represented in A and which is referred to herein as the 1,1-disubstituted ethylene type or an internal double bond as represented in B and referred to herein as the trisubstituted ethylene type.

It has been found that when boron fluoride is used as the catalyst for the polymerization of isobutylene, the resulting polymer shows a distribution range of from 61–77% with an average of about 68% of the 1,1-disubstituted type and a distribution range of 23–39% with an average of about 32% of the trisubstituted type. When aluminum chloride is used as the catalyst, the range is 16–34% with the average about 21% of the 1,1-disubstituted type and a 66–84% range with a 79% average of the trisubstituted type. It can be seen then that the polymerization product, when aluminum chloride is used as the catalyst, contains a high percentage of the trisubstituted ethylene groups and, when boron trifluoride is used as the catalyst, the polymerization product contains a relatively high percentage of the 1,1-disubstituted ethylene type. Consequently, the polymer produced by boron fluoride catalysis is generally more reactive as the external double bond of the 1,1-disubstituted type is more reactive than the sterically hindered internal double bond of the trisubstituted type. However, even the polymer prepared when boron fluoride is used as the catalyst, although containing 61–80% of the 1,1-disubstituted ethylene type polymer, is unsatisfactory for certain types of reactions since there is a considerable amount of polymer present which is substantially inert because of the internal double bond.

It is an object of the present invention to produce a reactive polymer of isobutylene. Another object of the invention is to produce an isobutylene polymer which contains a high percentage of external double bonds. Still another object of the present invention is to provide a process wherein the polymerization of isobutylene is conducted in the presence of a directive solvent. A still further object of the present invention is to conduct the polymerization of isobutylene at a constant temperature by carrying out the polymerization in a boiling solvent. A still further object of the present invention is to carry out the polymerization of isobutylene in a homogeneous system when a hydrocarbon-insoluble catalyst is used. A still further object is to provide a process for the production of high molecular weight isobutylene polymers. These and other objects of the present invention will be obvious to those skilled in the art from the following disclosure.

According to one aspect of the present invention the polymerization of isobutylene is carried out in the presence of a directive solvent selected from the group consisting of $SO_2$ and $CO_2$.

The isobutylene used as feedstock for the present invention may be obtained from any suitable source such as a $C_4$ refinery stream containing minor amounts of $C_3$ and $C_5$ hydrocarbons or may be an essentially pure $C_4$ stream containing a high concentration of isobutylene or may be a relatively pure isobutylene stream obtained from the cracking of isobutylene dimer.

Polymerization temperatures may range from −60° F. to 120° F., preferably the boiling point of the solvent or lower. Pressures may range from atmospheric to several hundred p.s.i.g. Any Lewis acid may be satisfactorily used as a catalyst. For example, ferric halides, zinc halides, aluminum halides, titanium halides, boron halides, tin halides, mercuric halides and the like are satisfactory although boron fluoride and aluminum chloride are preferred. Suitable co-catalysts for boron fluoride are water, alcohols, carboxylic acids, mineral acids, ethers and other oxygen containing polar compounds. The same co-catalysts, especially water and mineral acids, particularly hydrogen halides are suitable for use with aluminum chloride. The catalyst concentration may range from 0.01–30% by weight of the isobutylene feed, about 0.05–10% being preferred.

The product of the polymerization in which $SO_2$ or $CO_2$ is used as a solvent contains an increased ratio of molecules having an external double bond to molecules having an internal double bond.

The invention may be more readily understood from the following examples which are for illustrative purposes only and are not to be construed as limiting the invention in any manner.

*Example I*

30 grams of C.P. isobutylene was added to 270 grams of isobutane and was polymerized at 14° F. in the presence of 1.1 grams $AlCl_3$ which was added directly to the reaction mixture. After polymerization the reaction mixture was warmed to about 32° F. and the catalyst destroyed by the addition of water. The solvent was removed and the polymer then extracted twice with water, dried over anhydrous magnesium sulfate, filtered and stripped of solvent at 212° F. under mildly reduced pressure. The resulting polymer had a molecular weight of 1700 and the infrared absorbance at $11.2\mu$ was 0.035 and at $12.15\mu$ 0.015, indicating a distribution of 33% 1,1-disubstituted type and 67% trisubstituted type.

This example serves as a control to indicate typical reaction conditions and the type of product obtained. In this example it is also to be noted that the aluminum chloride catalyst was in the solid phase during the reaction.

*Example II*

Example I was repeated using 30 grams of isobutylene, 270 grams liquid $SO_2$ and 1 gram of aluminum chloride. The resulting polymer had a molecular weight of 3130 which indicates that the substitution of $SO_2$ as a solvent under essentially the same conditions yielded a polymer having approximately twice the molecular weight of the polymer obtained in Example I. It is also noted that in this example, the aluminum chloride dissolved in the solvent and as a result the reaction was carried out in a homogeneous system.

*Example III*

Example II was repeated using 30 grams of isobutylene, 240 grams $SO_2$ and 1 gram aluminum chloride. The resulting polymer showed infrared absorbances of 0.570 at $11.2\mu$ and 0 at $12.15\mu$ indicating the absence of any detectable amount of the trisubstituted type polymer and correspondingly indicating that $SO_2$ acts as a directive solvent and leads to the production of a polymer apparently completely in the 1,1-disubstituted form.

*Example IV*

30 grams of C.P. isobutylene was added to 270 grams isobutane and polymerization was carried out at 14° F. by bubbling boron trifluoride into the reactants below the surface thereof. The polymer was recovered from the reaction product as described in Example I and was found to have a molecular weight of 1086 and infrared absorbances at $11.2\mu$ of 0.470 and at $12.15\mu$ 0.070 indicating 61% 1,1-disubstituted type and 39% trisubstituted type.

*Example V*

60 grams of C.P. isobutylene was dissolved in 245 grams $SO_2$ and polymerization carried out at 14° F. by bubbling $BF_3$ into the reactants below the surface thereof. The polymer was recovered as in Example IV and infrared analysis showed no detectable amounts of the trisubstituted type indicating that the unsaturation was in the form of the 1,1-disubstituted ethylene type polymer.

In Examples II, III and V, maintaining the reactants at the desired reaction temperature presented no difficulty as the reaction was conducted under atmospheric pressure at the boiling point of the solvent.

*Example VI*

In this example using $CO_2$ as a solvent, Example IV is repeated with the substitution of $CO_2$ for $SO_2$, and the pressure is maintained at 375 p.s.i.g. $BF_3$ is then bubbled into the reaction mixture and the resulting polymer recovered by destruction of the catalyst with water, removal of the $CO_2$ by distillation. The polymer is then purified as in Example I. The resulting polymer shows infrared absorbances at 11.2 microns and 12.15 microns of 0.570 and 0.030 indicating 88.5% 1,1-disubstituted type polymer and 11.5% of the trisubstituted type.

In Examples I and IV, traces of moisture present in the feed and solvent acted as a co-catalyst for the nominal catalyst. In the other examples, moisture alone or combined with the solvent may have served as co-catalyst or the solvent alone may have been sufficient to activate the catalyst.

While in the examples above, the polymer was produced by adding solvent and isobutylene to the reactor, the temperature of the solvent and monomer was adjusted to polymerization temperature and the catalyst then added to the reaction mixture, either as a solid or in $SO_2$ solution in the case of $AlCl_3$ or by being bubbled in as in the case of $BF_3$, it is also possible to change the sequence of the addition of the various ingredients to the reactor. For example, the solvent and the catalyst may first be added to the reaction vessel and then the isobutylene may be added. It is also possible to introduce a portion of the solvent to the reaction vessel and then add the isobutylene and when the desired reaction temperature has been reached the catalyst, together with the balance of the solvent, is added to the reaction vessel. Conversely, it is possible to introduce a portion of the solvent and the catalyst into the reaction vessel and then add the isobutylene with the balance of the solvent at the desired temperature, or all of the catalyst and solvent may be introduced first into the reactor and then the isobutylene may be added either as a liquid or as a gas.

To obtain polymers of high molecular weight, it is desirable to conduct the polymerization at low temperatures and with a high ratio of monomer to catalyst. If low molecular weight polymers are desired, the polymerization is advantageously carried out with a high ratio of catalyst to monomer.

Obviously, many modifications and variations of the invention as hereinbefore set forth may be made without departing from the spirit and scope thereof and therefore only such limitations should be imposed as are indicated in the appended claims.

We claim:

1. A process for the production of polyisobutylene which comprises contacting isobutylene dissolved in a solvent consisting essentially of liquid $SO_2$ with a Friedel-Crafts metal halide catalyst.

2. The process of claim 1 in which the catalyst is boron fluoride.

3. The process of claim 1 in which the catalyst is aluminum chloride.

4. A process for the production of polyisobutylene consisting substantially completely of di-substituted ethylene-type polymer which process comprises contacting isobutylene dissolved in a solvent consisting essentially of liquid $SO_2$ with a Friedel-Crafts metal halide catalyst at a temperature between $-40°$ F. and $120°$ F.

5. The process of claim 4 in which the catalyst is boron fluoride.

6. The process of claim 4 in which the catalyst is aluminum chloride.

7. The process of claim 4 in which the polymerization is conducted at a temperature of about 14° F.

References Cited in the file of this patent

UNITED STATES PATENTS

| | | |
|---|---|---|
| 2,481,273 | Young | Sept. 6, 1949 |
| 2,536,841 | Dornte et al. | Jan. 2, 1951 |
| 2,901,471 | Pavlick | Aug. 25, 1959 |